United States Patent [19]

Quin

[11] 4,329,230
[45] May 11, 1982

[54] CONVEYOR SYSTEM

[76] Inventor: Michael J. Quin, 27230 Shehan, Dearborn Heights, Mich. 48127

[21] Appl. No.: 149,006

[22] Filed: May 12, 1980

[51] Int. Cl.³ .......................................... B01D 23/02
[52] U.S. Cl. .................................. 210/413; 198/719; 209/389; 210/159
[58] Field of Search ............... 198/719, 728, 731, 732; 209/385, 389; 210/159, 162, 407, 408, 413, 414

[56] References Cited

U.S. PATENT DOCUMENTS

| | | | |
|---|---|---|---|
| 900,554 | 10/1908 | Knapp | 198/719 |
| 1,215,345 | 2/1917 | Clark | 198/719 |
| 1,331,935 | 2/1920 | Lee | 210/159 |
| 2,014,834 | 9/1935 | Coffey et al. | 210/413 |
| 2,537,878 | 1/1951 | Coon | 210/407 |
| 3,568,839 | 3/0197 | Dunlea | 210/525 |
| 3,599,795 | 8/1971 | Worlidge | 210/413 |
| 3,613,891 | 10/1971 | Cloutier | 210/526 |
| 3,677,407 | 7/1972 | McIlvaine | 210/519 |
| 3,762,558 | 10/1973 | Anderson | 210/400 |
| 4,243,527 | 1/1981 | Leonard | 210/407 |
| 4,277,339 | 7/1981 | Quin | 210/413 |

*Primary Examiner*—Peter A. Hruskoci

[57] ABSTRACT

A conveyor scraper for use in an apparatus for separating cake from liquid is disclosed. The apparatus comprises a reservoir for holding cake containing liquid and a continuous conveyor inclined upward from a surface of the liquid. A plurality of outward extending scrapers are movable with the conveyor and engage are inclined wall spaced below and parallel to the conveyor to move the cake along the wall. The scraper is pivotably mounted to the conveyor to permit the scraper to pivot upon encountering an obstruction to avoid stalling or otherwise damaging the conveyor. The scraper is biased into engagement with the inclined wall permitting movement of the scraper toward the wall as wear occurs.

4 Claims, 5 Drawing Figures

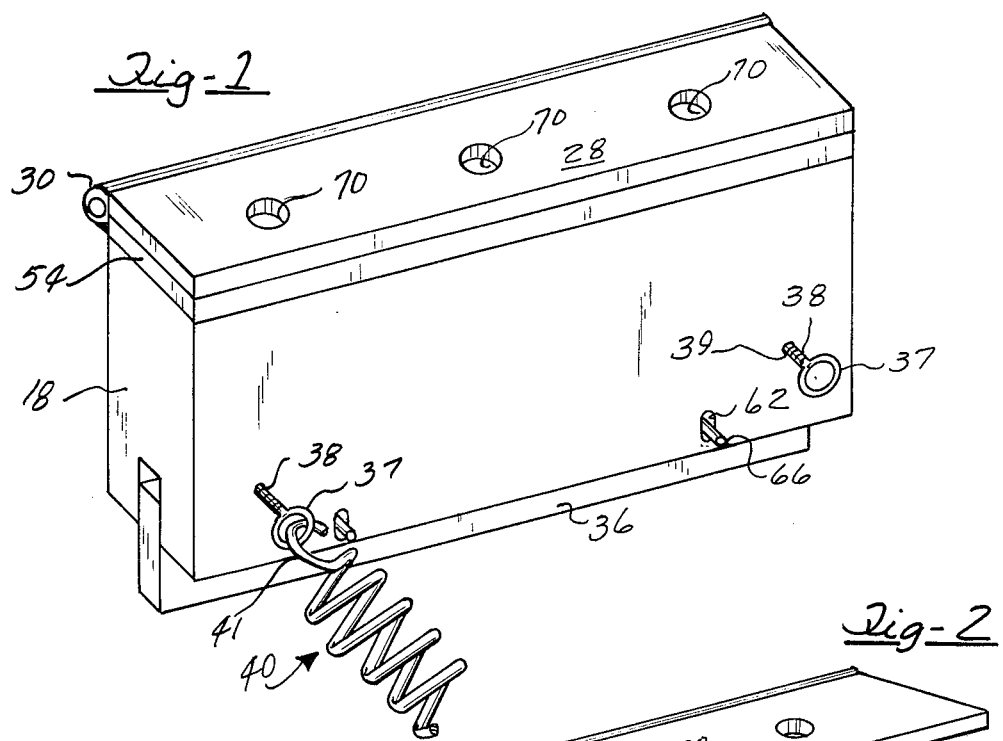
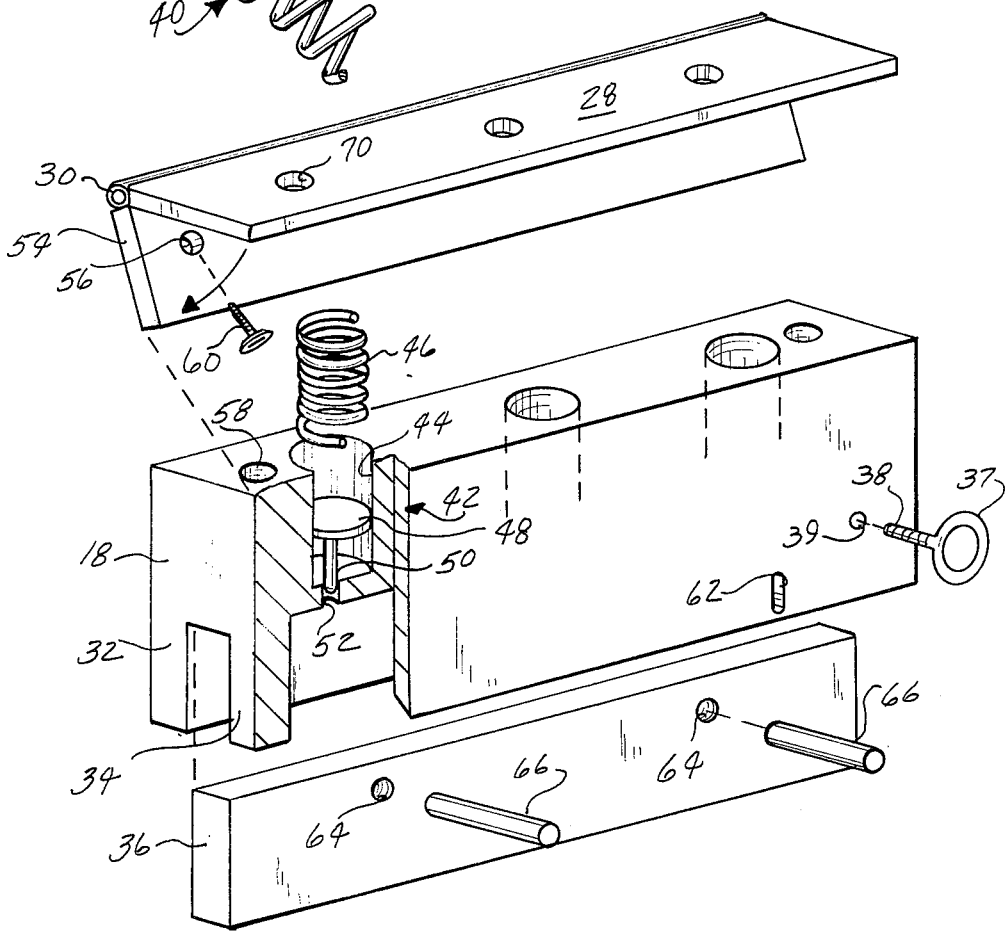

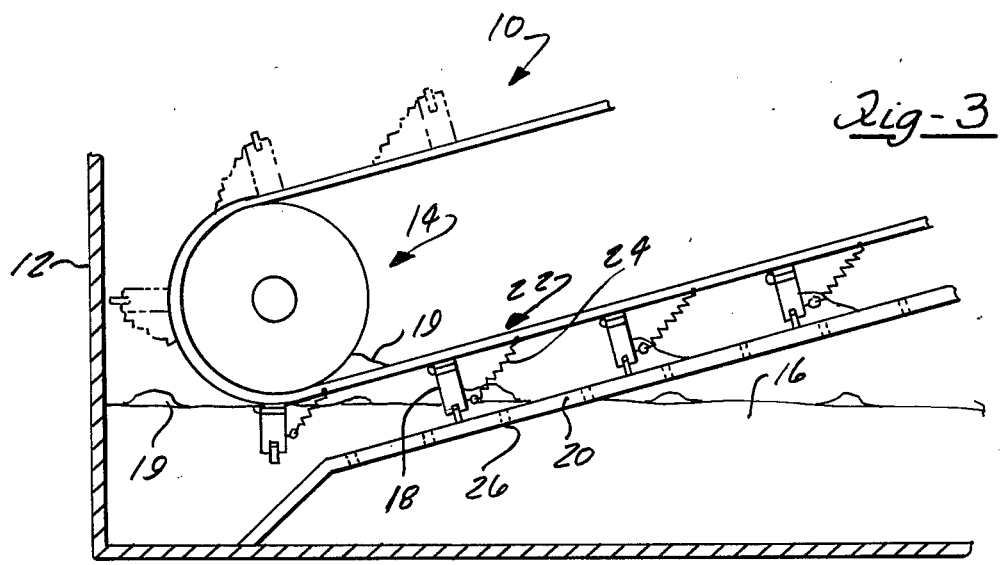
_Fig-3_
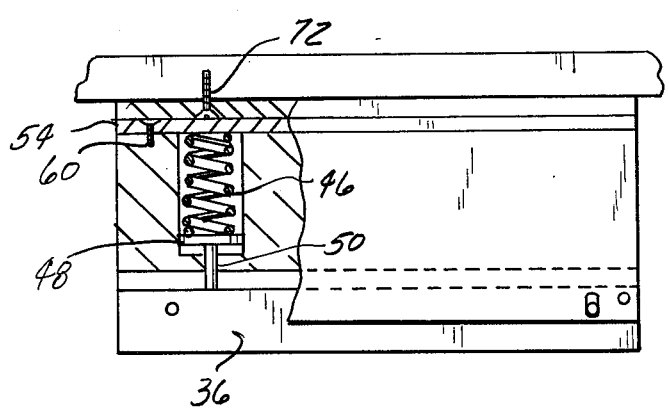
_Fig-4_
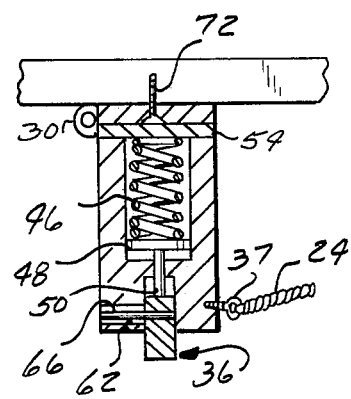
_Fig-5_

CONVEYOR SYSTEM

BACKGROUND OF THE INVENTION

I. Field of the Invention

The present invention generally relates to filtering devices and, in particular, the present invention is concerned with filter devices for separating cake from a liquid. Even more particularly the present invention is concerned with devices for separating cake from liquid which employ a conveyor device having scrapes for engaging the cake and moving the cake along an inclined wall to separate the liquid therefrom.

II. Cross Reference to Related Applications

This application relates to Applicant's co-pending application Ser. No. 097,484, filed Nov. 26, 1979, entitled PAINT PIGMENT SKIMMER, now U.S. Pat. No. 4,277,339.

III. Description of the Prior Art

Devices employing a conveyor for separating cake from liquid utilizing scrapers to move the cake along an inclined ramp to allow the liquid to drain therefrom are known. A variety of methods have been proposed for separating cake from liquid, and examples of devices using conveyors for moving cake in the prior art are disclosed in U.S Pat. Nos. 3,568,839; 3,599,795; 3,613,891; 3,677,407; and 3,762,558. These patents are relevant to the Applicant's invention in that they represent the closest prior art utilizing conveyors for moving cake to separate the cake from liquid. Applicant's co-pending application Ser. No. 097,484 filed Nov. 26, 1979, now U.S. Pat. No. 4,277,339, discloses an apparatus for separating pigment containing cake from a vehicle such as water using a conveyor belt for skimming cake from vehicle.

SUMMARY OF THE INVENTION

The present invention which will be described in greater detail hereinafter comprises an apparatus for separating cake from a liquid comprising: a reservoir for holding the cake containing liquid; a continuous conveyor inclined upward from a surface of the cake containing luquid; at least one outward extending scraper blade movable with the conveyor; and an inclined wall engageable with the scraper positioned below and parallel to the conveyor. The scraper is pivotably mounted to the conveyor and spring biased to an upright position so that upon encountering an obstruction not capable of being conveyed, the scraper is allowed to pivot and avoid the obstruction thereby preventing damage to the conveyor and down time due to stalling and breakage.

The scraper of the present invention further includes a biasing device for biasing the scraper into engagement with the inclined wall which permits movement of the scraper toward the wall as wear occurs. This permits efficient separation of cake from the liquid due to the continuous contact of the scraper with the inclined wall.

It is therefore a primary object of the present invention to provide a new and improved device for separating cake from vehicle.

It is a further object of the present invention to provide a device for separating cake from a vehicle which employs a scraper pivotably mounted to a conveyor.

It is yet another object of the present invention to provide a improved device for separating cake from liquid which employs a pivotably mounted scraper biased to an upright position.

It is a further object of the present invention to provide a device for separating cake from liquid which employs a conveyor mounted scraper in engagement with an inclined wall with the scraper biased into engagement with the wall and capable of movement toward the wall as wear occurs.

Further objects, advantages, and applications of the present invention will become apparent to those skilled in the art to which this invention pertains, when the accompanying description of one example of the best mode contemplated for practicing the invention is read in conjunction with the accompanying drawing.

BRIEF DESCRIPTION OF THE DRAWING

In the drawing, like reference numbers refer to like parts throughout the several views, and wherein:

FIG. 1 illustrates a broken perspective view of the scraper of the present invention;

FIG. 2 illustrates a broken perspective exploded view of the scraper of the present invention;

FIG. 3 illustrates a partial side view of the conveyor of the present invention;

FIG. 4 illustrates a partially sectioned side view of the scraper of the present invention; and FIG. 5 illustrates a partially sectioned end view of the scraper of FIG. 4.

DESCRIPTION OF THE PREFERRED EMBODIMENT

Referring now to the drawing and in particular to FIG. 3 wherein there is illustrated at 10 one example of the apparatus of the present invention in the form of a device for separating cake 19 from liquid comprising a reservoir 12 for holding a cake containing liquid and a continuous conveyor 14 inclined upward from a surface 16 of the cake containing liquid. At least one outward extending scraper 18 is movable with the conveyor and engages an inclined wall 20 which is positioned below the conveyor 14 and parallel thereto. The conveyor 14 further includes a pivoting means 22 to permit the scraper 18 to pivot relative to the conveyor upon encountering an obstruction incapable of being conveyed to prevent stalling or damage to the conveyor. A biasing means 24 is provided to urge the scraper to an upright position until an obstruction is encountered permitting the scraper to pivot past the obstruction and then resume its upright position.

In operation the conveyor 14 moves the scrapers 18 permitting them at a lower end to dip below the surface 16 and engage a quantity of cake 19 urging the cake along the inclined wall 20. A certain amount of liquid is conveyed along the wall with the cake 19, and a plurality of apertures 26 through the inclined wall 20 allow liquid to drain back to the reservoir 12 as the cake and liquid are urged therealong. The drained cake reaches the top of the reservoir and is dropped into a storage container (not shown) at the end of the conveyor. As shown in FIGS. 1 and 2, the means 22 for pivotably mounting the scraper 18 to the conveyor 14 and permitting the scraper to pivot upon encountering an obstruction comprises: a conveyor engaging member 28 transversely hinged by a hinge means 30 abutting the conveyor 14; the hinge means 30 allows the scraper 18 to pivot counter to the direction of conveyor movement upon encountering an obstruction. A pair of spaced parallel upright walls 32,34 integral with the scraper 18 carry a scraper blade 36 therebetween permitting the scraper blade 36 to pivot with the scraper 18.

The means 24 for biasing the scraper 18 to an upright position comprises an eye 37 including a threaded end 38 threadingly engageable with a threaded aperture 39 formed in an outward end of the scraper 18, and an extension spring 40 having a hook end 41 which engages the eye 37. An end of the extension spring 40 is anchored to the conveyor 14 to bias the scraper 18 to an upright position and allow the extension spring 40 to be extended upon encountering an obstruction too heavy to be conveyed without stalling or damaging the conveyor. The scraper 18 further includes a means 42 for biasing the scraper blade 36 into engagement with the inclined wall 20 which will be described in greater detail subsequently.

The means 42 for biasing the scraper blade 36 into engagement with the inclined wall comprises the scraper blade 36 slidingly retained between the spaced upright walls 32,34; an upright bore 44 formed in the scraper 18; a biasing spring 46 slidingly engaging the bore 44 and abutting at an upper end a lower portion 54 of the hinge means 30. The hinge means lower portion is secured to the scraper 18 by a pair of screws 60 engaging a pair of apertures 56 formed in the lower portion 54. The screws 60 engage a pair of threaded apertures 58 formed in the scraper 18 to secure the lower portion 54 to the scraper 18. In a preferred embodiment, as shown in greater detail in FIGS. 4 and 5, the biasing spring 46 has its biasing force urged against the scraper blade 36 in the following manner: a disk 48 abuts a lower end of the biasing spring 46 and the disk 48 in turn rests upon a rod 50 which slidingly extends through a reduced diameter bore 52 to abut the scraper blade 36 urging the blade downward against the inclined wall 20. The scraper blade 36 is limited in its travel by a pair of spaced apart aligned upright slots 62 formed near a lower edge of the upright walls 32,34, and a pair of apertures 64 formed in the scraper blade 36 are aligned with the slots 62. A cross pin 66 is configured to snugly engage the apertures 64 and slidingly engage the slots 62. The movement of the pin 66 within the slots 62 defines the position and travel of the scraper blade 36. This permits the scraper blade 36 to move out of abutment with the wall 20 without the biasing spring 46 expelling the scraper blade 36 from the scraper. A plurality of apertures 70 formed in conveyor engaging member 28 receive a plurality of fasteners 72 to secure the member to the conveyor.

It can thus be seen that the present invention has provided a new and improved apparatus for separating cake from a liquid which employs a scraper for moving cake along an inclined wall that is pivotably mounted to pivot upon encountering an obstruction not capable of being conveyed. The scraper further includes a device for biasing the scraper blade into engagement with the inclined wall to permit movement of the scraper blade toward the wall as wear occurs and allows intimate and continuous contact between the blade of the scraper and the wall as it moves therealong, except when the scraper must be moved away from the wall to move past an obstruction without stalling the conveyor.

It should be understood by those skilled in the art to which this invention pertains, that other forms of the Applicant's invention may be had, all coming within the spirit of the invention and the scope of the appended claims.

Having thus described my invention what I claim is:

1. An apparatus for separating cake from a liquid comprising:
    a reservoir for holding the cake containing liquid;
    a continuous conveyor supported within the reservoir inclined upward from a surface of the cake containing liquid;
    at least one outward extending scraper movable with the conveyor;
    an inclined wall supported within the reservoir engageable with the scraper positioned below and parallel to said conveyor including a plurality of drain apertures to allow liquid to drain through under gravity;
    means for pivotally mounting the scraper to the conveyor and permitting said scraper to pivot upon encountering an obstruction not capable of being conveyed comprising a conveyor engaging member transversely hinged thereto and abutting the conveyor, a hinge means joining the conveyor engaging member and the conveyor and allowing the conveyor engaging member to pivot counter to the direction of conveyor movement, a pair of spaced parallel upright walls integral with the conveyor engaging member, a scraper blade carried between the upright walls to pivot therewith;
    biasing means for biasing the scraper in an upright position; and
    means for biasing the scraper blade into engagement with the inclined wall permitting movement of the scraper blade toward the wall as wear occurs comprising at least one bore formed in the scraper, a biasing spring slidingly engaging the bore and biasing the blade toward the inclined wall.

2. The apparatus as defined in claim 1 further comprising:
    a pair of spaced apart upright slots formed near a lower edge of the upright walls;
    an aperture formed in the scraper blade aligned with the slots; and
    a cross pin snugly engaging the aligned aperture and slidingly engaging the slots, the movement of the pin within the slots limiting travel of the scraper blade.

3. The apparatus as defined in claim 1 wherein the means for biasing the scraper in an upright position comprises an extension spring affixed to one end to the conveyor and affixed at another end to an outward end of the scraper, said spring biased to hold said scraper in an upright position and allow the scraper to pivot counter to the direction of conveyor movement upon encountering an obstruction.

4. The apparatus as defined in claim 1 wherein the scraper blade is replacable.

* * * * *